United States Patent [19]

Garagnani et al.

[11] Patent Number: 4,548,993
[45] Date of Patent: Oct. 22, 1985

[54] METHOD FOR IMPROVING THE CHARACTERISTICS OF POLYOLEFINS UNDER HEATING

[75] Inventors: Enea Garagnani, Ferrara; Alessandro Moro, Occhiobello; Roberto Marzola, Ferrara, all of Italy

[73] Assignee: Montedison S.p.A., Milan, Italy

[21] Appl. No.: 465,106

[22] Filed: Feb. 9, 1983

[30] Foreign Application Priority Data

Feb. 10, 1982 [IT] Italy ............................... 19551 A/82

[51] Int. Cl.[4] .......................................... C08F 255/02
[52] U.S. Cl. .................................... 525/195; 525/192; 525/286; 525/291; 525/293; 525/296; 525/301; 525/313
[58] Field of Search ............... 525/192, 195, 286, 301, 525/291, 292, 313, 293, 296

[56] References Cited

U.S. PATENT DOCUMENTS 4,350,740 9/1982 Coran .................................. 525/296
4,376,189 3/1983 Trivette .............................. 525/296

*Primary Examiner*—Christopher A. Henderson

[57] ABSTRACT

Process for cross-linking polypropylene, propylene copolymers, polyethylene, ethylene/propylene and ethylene/propylene/diene elastomeric copolymers and mixtures of said elastomers with above said thermoplastic polyolefins, which consists in modifying the polymer in the molten state, by the addition of 0.01%–10% by weight of carboxylic acid, possibly in the presence of a generator of radicals and by the subsequent salification with metal ions of the thus grafted carboxylic groups. The polymer products thus obtained display considerably improved characteristics under heating. In particular, there are obtained improved processability and elastic recovery characteristics for thermoplastic rubbers.

8 Claims, No Drawings

METHOD FOR IMPROVING THE CHARACTERISTICS OF POLYOLEFINS UNDER HEATING

THE PRIOR ART

It is quite known that polypropylene (PP), low-density polyethylene (LDPE), high-density polyethylene (HDPE) and the ethylene/vinylacetate (EVA) copolymers are excluded from certain applications inasmuch they do not meet the required rigidity and creep-resistance characteristics at high temperatures, required for technopolymers.

While in the case of HDPE, LDPE and EVA it is possible to overcome this drawback by means of a reticulation or cross-linking with peroxides, this is not possible in the case of PP since said polymer suffers, in the presence of the peroxide, from a degenerative process.

THE PRESENT INVENTION

An object of the present invention is a process for preparing cross-linked polymers and copolymers of alpha-olefins, such as PP, LDPE, HDPE, EVA copolymers, ethylene/propylene (EPM) and ethylene/propylene/diene (EPDM) elastomers, endowed with improved properties under heating. Said process consists in grafting onto the polymeric chain a carboxylic acid, through a mechanical mixing at a temperature of at least 170° C. of the polymeric product with the acid itself, possibly in the presence of a generator of radicals, and in the subsequent salification of the free carboxylic groups with metal compounds of a basic character.

The cross-linking of the PP, HDPE and LDPE imparted by the carboxylic groups grafted onto the polymeric chain, and salified with metal ions, improves consistently the properties under heat of the polyolefins, such as the heat distorsion temperature (HDT), the VICAT hardness, the elasticity modulus and the creep at high temperature.

Said cross-linking is conducted in the molten state in an extruder or internal mixer by the admixture of 0.01 to 10% by weight of carboxylic acid in the presence of or absence of organic peroxide, and by the successive addition of a salifying substance.

By the term "internal mixer" herein after there will be understood an apparatus which will act on the polymeric material in the plastic state.

In order to achieve PP, HDPE, LDPE and EVA with a very low degree of cross-linking, it will be sufficient to graft onto the polyolefin only just carboxylic acid.

Said operation may be carried out in an extruder or internal mixer, in the absence or in the presence of peroxide, depending on what type of modifier is being used.

The grafting onto the polyolefin occurs in the absence of peroxides or other radical generators when, as modifiers, there are used mono- or dicarboxylic acids with from 7 to 12 carbon atoms, having an aromatic group with a substituent chosen from amongst the sulphonylazides or their derivatives such as monoesters and anhydrides, or mono- or dicarboxylic acids with from 7 to 12 carbon atoms, having a functional group of the benzoylazide, acylazide, formylazide, phenylazide, alkylazide type or their derivatives such as for instance monoesters and anhydrides, or maleamic acids of the general formula given below, or their derivatives such as monoesters and anhydrides.

The maleamic acids used for the purpose are of the general formula:

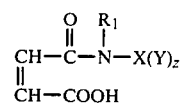

wherein:
Y = a group of the formula:

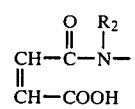

X may be, when $z=1$, a radical of the formula $—(CHR)_n$, wherein n is an integer from 2 to 18, while R is H or an alkyl, or a bivalent aromatic, cycloaliphatic or heterocyclic radical containing or not containing specific functional groups such as the carboxylic, aminic, epoxidic, mercaptanic, esteric, vinylic and halogenhydric group;
$R_1$ and $R_2$ may be hydrogen or an alkyl having from 1 to 6 carbon atoms, or they may form together a bivalent $—(CHR)_n$ group when $X = —(CHR)_n$.

Typical and preferred maleamic acids are:
N-carboxymethylmaleamic acid

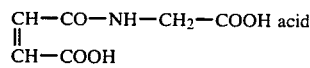

N,N'-isophoron-bis-maleamic acid of the structure:

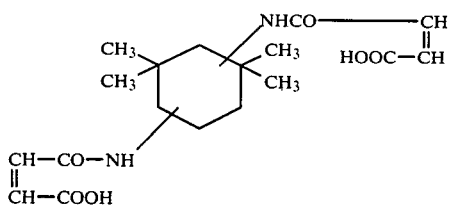

N,N'-2,5-dimethylene-norbornane -bis-maleamic acid of the structure:

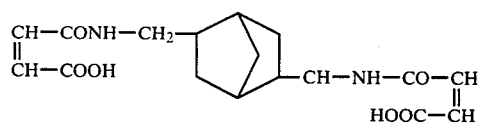

N,N'-ethylene-bis-maleamic acid of the formula:

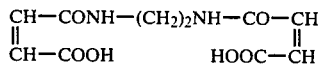

In the presence of small quantities of peroxide (0.01 to 0.05%) also the unsaturated carboxylic acids listed below may be grafted onto the olefins. Said acids are: maleic acid, monoesters of maleic acid, maleic anhydride, fumaric acid, monoesters of fumaric acid, itaconic acid, vinylbenzoic acid, vinylphthalic acid, acrylic acid, methacrylic acid and unsaturated α,β-mono- or dicarboxylic acid containing up to 8 carbon atoms, a monoester or an anhydride of such a dicarboxylic acid.

In order to obtain polyolefins with a high degree of cross-linking, the polyolefins themselves, thus modified with carboxylic groups, must be salified with metal ions in an extruder or in an internal mixer.

The salifying substances used, are in the main: salts, oxides, alcoholates and acetylacetonates of mono-, bi- or trivalent metals.

Not all the substances salify the grafted carboxylic groups with the same speed and with the same effectiveness, but their different and various compatibilities in the starting polymers in question involve different salification kinetics.

Particularly indicated for the polyolefins are the alcoholates, while, as far as the cations are concerned, the effectiveness increases with the valency and with decrease in size of the cation itself, especially as far as the monovalent cations are concerned.

Excellent results are achieved with trivalent cations, particularly with aluminum which is preferably used in a quantity equal to the stoichiometric quantity with respect to the carboxylic group, or in ecess of such a quantity up to 100%.

The salification reaction should preferably be carried out immediately after the polyolefin grafting reaction, by adding the salifying substance only a few minutes after the addition of the modifier, when an internal mixer is used, or by a second extruding when an extruder is used.

The modifying agent, the possible radical generator and the salifying substance may be introduced into the internal mixer or into the extruder also simultaneously.

In this case the results are satisfactory only when the graft-reaction is faster than the salifying reaction or when the possible reaction between the modifying agent and the salifying agent leads to a product that is still capable of grafting itself onto the polyolefin.

Both the graft-reaction as well as the salifying reaction are in all cases conducted at a temperature comprised between 170° and the decomposition temperature of the polyolefin itself.

The examples given hereinafter are meant to illustrate and exemplify the invention in more detail without, however, in any way limiting the scope of the invention itself.

In each example there is indicated the value of the melt index with reference to ASTM D 1238 standards, and the creep value in the bending under heat for the thermoplastic polyolefin and the melt index values and the tension set at 100° C. with an elongation of 75% for the thermoplastic rubbers made of mixes of PP and EPM.

The creep under bending, which gives the measure of the deformation under bending, is determined by subjecting an injection-molded test piece, obtained according to ASTM D 638 rules of type I by traction (pulling), placed on two supports distanced from each other 4 cm., to a bending load or stress expressed in Kg/sq.cm as a function of the cross-section of the test piece, and which is given by the formula:

$$(3 \cdot P \cdot d)/2 \cdot 1 \cdot h^2)$$

wherein:
P=applied force in Kg.,
d=distance between supports,
l=width of test piece,
h=height of test piece.

After a certain stretch of time of bending stress at the indicated temperature, the deflection was measured. The creep-under-bending value is given by the formula:

$$(600 \cdot h \cdot f \cdot)/d^2$$

wherein:
f=deflection.

The tension set is the measure of the residual deformation in a test piece subjected to a tensile load at 100° C. up to an elongation of 75% with respect to the starting value, and maintained under these conditions for 10 minutes at 100° C. Thus the residual elongation will be measured and will be expressed in % with respect to the initial length of the test piece.

The test piece is prepared according to ASTM D 412-66 rules, with cross-section of 1.8 × 1.8 mm and a useful length of 50 mm.

EXAMPLE 1

100 parts of MOPLEN X30G (trademark of Montedison: it is polypropylene in granules; melt index L=9), were coated with 0.2 parts of vaseline, in a powder mixer, and successively coated with 0.05 parts of Peroximon F (trademark of Montedison) that is [1,3-bis(terbutylperoxyisopropyl)benzene] and 0.5 parts of N-carboxy-methylmaleamic acid.

Such granulate was then extruded in a double-screw Pasquetti extruder, at 190° C. 100 parts of this extruded substance (I) were then mixed together with 4 parts of a "master" consisting of 50 parts of Fertene LG1-1300 (trademark of Montedison: LDPE with melt index E=70) and 50 parts of aluminum isopropylate, and this mixture was then extruded at 200° C., still on a Pasquetti double-screw extruder.

The extruded mix (II) thereby resulting, was then characterized as follows:

| | Moplen X30G | Extrusion (I) | Extrusion (II) |
|---|---|---|---|
| Melt Index L | 9 | 100 | 0.52 |
| Creep under bending at 100 °C., with load of 20 Kg/cm² and distance between supports = 4 cm., on an injection molded test piece. % deformation after 1 hour | 1.06 | 0.96 | 0.80 |

It should be noted that PP at a melt index L=0.35 and 0.7 respectively, when subjected to the same creep test, will show a deformation of 1.34% and 1.22% respectively.

EXAMPLE 2

100 parts of MOPLEN FL20 (PP in flakes at a melt index L=12) were mixed together in a powder mixer with 0.05 parts of Peroximon F, 0.5 parts of N-carboxymethylmaleamic acid and 4 parts of a master consisting of 50 parts of Ferten LG1-1300 and 500 parts of aluminum isopropylate. This mixture was then extruded on a Pasquetti double-screw extruder, at 190° C., and was then characterized (granulate I).

|  | Moplen FL F20 | Granulate I |
|---|---|---|
| Melt index L | 12 | 21 |
| Creep under bending at 110° C., with a load of 20 Kg/sq. cm and distance between supports = 4 cm., on injection molded test pieces. | | |
| % deformation after 1 hour | 1.06 | 0.70 |

EXAMPLE 3

100 parts of MOPLEN T30G (trademark of Montedison: it is polypropylene in granules, with a melt index L=2.9), 0.05 parts of Peroximon F and 0.5 parts of N-carboxymethylmaleamic acid were introduced into a Banbury-type internal mixer.

After 5 minutes of mixing in the Banbury, once the temperature of the melten mass had reached 180° C., there was introduced into the mixer 0.5 parts of aluminum isopropylate and then, after further 3 minutes, the whole mix (sample I) was discharged and characterized.

|  | Moplen T30G | Sample I |
|---|---|---|
| Melt index L | 2.9 | 1.5 |
| Creep under bending carried out at 110° C., under a load of 30 Kg/cm² and distance between supports = 4 cm., on injection molded test pieces. | | |
| % deformation after 1 hour | 1.83 | 1.40 |

EXAMPLE 4

100 parts of MOPLEN X30G and 2 parts of N-carboxymethylmaleamic acid were introduced into a Brabender-type internal mixer, operating at 200° C.

After 3 minutes there were added 2 parts of an aluminum sec-butylate and then, after further 3 minutes of mixing, Sample (I) was discharged and characterized.

|  | Moplen T30G | Sample I |
|---|---|---|
| Melt index L | 9 | 4.1 |
| Creep under bending at 110° C. under a load of 20 Kg/sq. cm and a distance between supports = 4 cm., on injection molded test pieces. | | |
| % deformation after 1 hour | 1.06 | 0.95 |

EXAMPLE 5

100 parts of MOPLEN EPQ30R (trademark of Montedison: propylene-ethylene plastic copolymer in granules, having a melt index L=0.69 and a content in $C_2$ equal to 9%), 0.5 parts of monoethylmaleate and 0.3 parts of Peroximon F were introduced into an internal mixer of the Brabender type, operating at 200° C. After 3 minutes there were added 2 parts of aluminum isopropylate and thus, after further 3 minutes of mixing, the sample was discharged and characterized.

|  | Moplen EPQ30R | Sample I |
|---|---|---|
| Melt index L | 0.69 | 0.10 |
| Creep under bending at 110° C., with a load of 20 Kg/sq. cm and distance between supports = 4 cm., on injection molded test pieces. | | |
| % deformation after 1 hour | 1.50 | 1.21 |

EXAMPLE 6

100 parts of MOPLEN R0QG6015 (trademark of Montedison: HDPE in granules with a melt index E=5.5) were coated with 0.2 parts of vaseline in a powder mixer, and successively coated with 0.05 parts of Peroximon F and 0.1 part of N-carboxymethylmaleamic acid.

This granulate was then extruded at 190° C. on a double-screw extruder, and, finally, was characterized. 100 parts of the extruded granulate (I) were then introduced into an internal mixer of the Brabender-type, operating at 190° C., together with 2 parts of aluminum isopropylate. The resulting Sample (II) was then characterized.

|  | Moplen R0QG6015 | Extrusion (I) | Extrusion (II) |
|---|---|---|---|
| Melt index E | 5.5 | 4.0 | 0.48 |
| Creep under bending at 80° C., with load of 30 Kg/sq. cm and supports distanced 4 cm., on injection molded test pieces. | | | |
| % deformation after 1 hour | 1.65 | 1.60 | 1.20 |

EXAMPLE 7

100 parts of MOPLEN R0QG6015 (HDPE with a melt index E equal to 5.5), 0.2 parts of N,N'-isophoronbismaleamic acid, 0.05 parts of Peroximon F and 2 parts of aluminum isopropylate were introduced into a Brabender-type internal mixer operating at 190° C.

After 4 minutes of mixing, Sample (I) was discharged and characterized.

|  | Moplen R0QG6015 | Sample (II) |
|---|---|---|
| Melt index E | 5.5 | 0.63 |
| Creep under bending at 80° C., with a load of 30 Kg/sq. cm and distances between the supports = 4 cm., on injection molded test pieces. | | |
| % deformation after 1 hour | 1.65 | 1.23 |

EXAMPLE 8

20 parts of MOPLEN X30G, 80 parts of Dutral C0034 (trademark of Montedison: ethylene/propylene copolymer with a content in $C_3$=30%), 0.5 parts of N-carboxymethylmaleamic acid and 0.12 parts of Peroximon F were introduced into an internal mixer of the Banbury type.

After 5 minutes, when the molten mass had reached 180° C. the same was discharged and Sample (I) characterized. 100 parts of the same sample were then introduced into an internal mixer of the Brabender type, operating at 200° C., together with 2 parts of an aluminum isopropylate. Sample (II) was discharged after 3 minutes and then characterized.

|  | 20% Moplen X30G 80% Dutral CO034 | Sample (I) | Sample (II) |
|---|---|---|---|
| Melt index L° | 26.67 | 24.40 | 0.68 |
| Tension set at 100° C. with an elongation of 75% | 75 | 75 | 75 |

EXAMPLE 9

100 parts of ethylene/vinylacetate copolymer, with a content in vinylacetate of 14% and a melt index E=7.5, 3 parts of N-carboxymethylmaleamic acid and 0.05 parts of Peroximon F were introduced into a Brabender-type internal mixer operating at 190° C. After 3 minutes operation there were added 2 parts of aluminum sec-butylate and then, after further 3 minutes mixing, Sample (I) was discharged and characterized.

|  | EVA at 14% VAC | Sample (I) |
|---|---|---|
| Melt index E | 7.5 | 1 |
| Creep under bending carried out at 70° C. with a load of 30 Kg/sq. cm and a distance between the supports = 4 cm., on injection molded test pieces. % deformation after 30 minutes | 2.12 | 1.91 |

What we claim is:

1. Process for the cross-linking of polymers and copolymers of alpha-olefins to improve the mechanical resistance characteristics thereof under heating, said process consisting in grafting a carboxylic acid, onto the polymeric chain by mechanical mixing of the polymeric product with the acid, at a temperature of at least 170° C., and in the subsequent salification of the free carboxylic groups with metal compounds of a basic character, said carboxylic acid being introduced in a quantity equal to from 0.01% to 10% by weight on the weight of the starting polymeric product.

2. Process according to claim 1, characterized in that there is used a carboxylic acid containing an azotide group having radical-generating function.

3. Process according to claim 1, characterized in that there is used a carboxylic acid of the general formula:

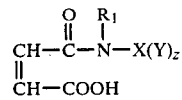

wherein:
Y is a group for formula:

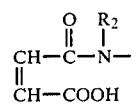

X, when Z is 1, is a radical of the formula —(CHR-)$_n$— wherein n is an integer from 1 to 18, while R is H or an alkyl, or a bivalent aromatic, cycloaliphatic or heterocyclic radical, while, when Z is 0, X is an aliphatic, aromatic, cycloaliphatic or heterocyclic radical containing or not containing specific functional groups; and R$_1$ and R$_2$ may be hydrogen or an alkyl having from 1 to 6 carbon atoms, or they may form together a bivalent group —(CHR)$_n$— when X is —(CHR-)$_n$—.

4. Process according to claim 1, characterized in that there is used an unsaturated carboxylic acid in the presence of a radical generator of the organic peroxide type.

5. Process according to claim 1, characterized in that as a salifying agent there is used a basic compound of a trivalent metal.

6. Process according to claim 5, characterized in that as a salifying agent there is used an Al-alcoholate.

7. The process of claim 1, in which a generator of radicals is also present during the mechanical mixing of the polymeric product and carboxylic acid.

8. The process of claim 3, in which when Z is 0, X is an aliphatic, aromatic, cycloaliphatic or heterocyclic radical containing functional groups selected from the groups consisting of carboxylic, aminic, epoxy, mercaptanic, esteric, vinylic and halogenhydric groups.

* * * * *